INVENTORS
Robert M. Van House &
Donald M. Flory
D. D. McGraw
ATTORNEY

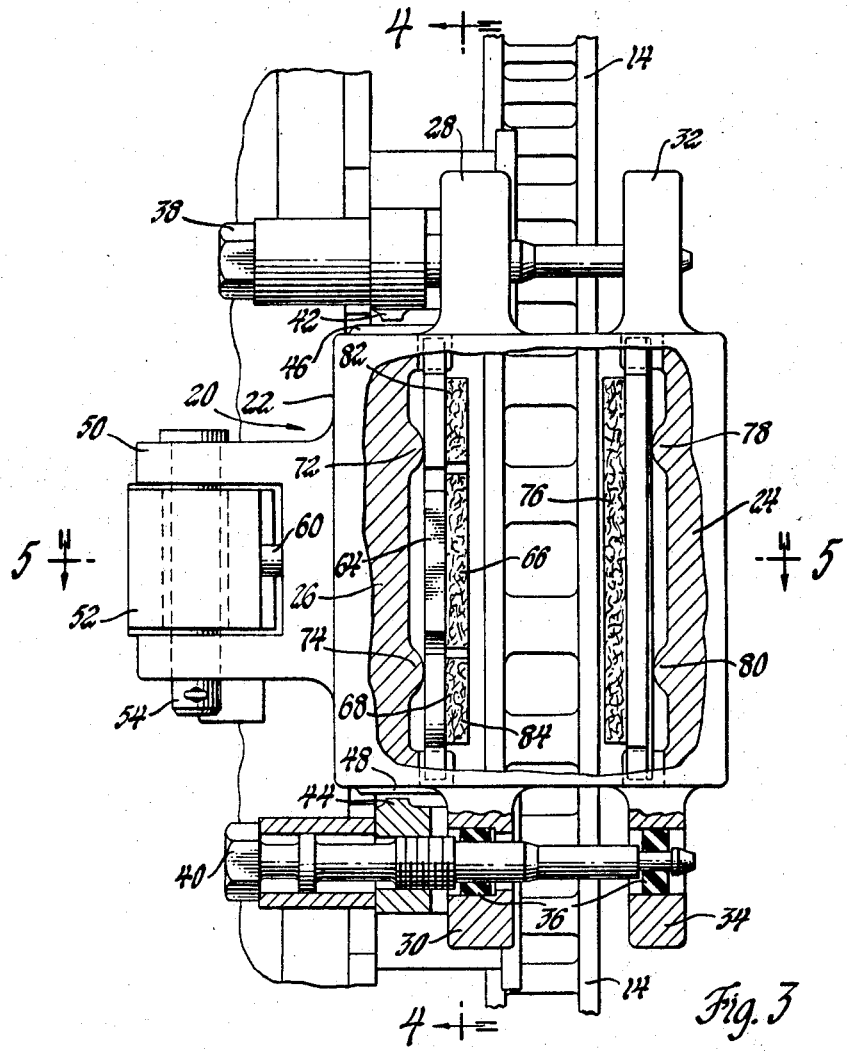
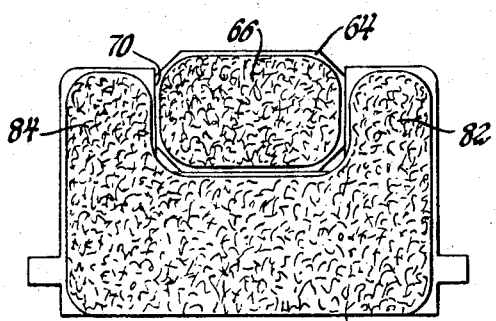
Fig. 3
Fig. 4
INVENTORS.
Robert M. Van House &
Donald M. Flory
ATTORNEY INVENTORS
Robert M. Van House &
Donald M. Flory

ATTORNEY

United States Patent Office 3,422,933
Patented Jan. 21, 1969

3,422,933
SELF-ENERGIZED DISC BRAKE ASSEMBLY
Robert M. Van House, Dayton, and Donald M. Flory, Arcanum, Ohio, assignors to General Motors Corporation, Detroit, Mich., a corporation of Delaware
Filed Aug. 17, 1967, Ser. No. 661,245
U.S. Cl. 188—73                           5 Claims
Int. Cl. F16d 5/06; B60t 7/12

ABSTRACT OF THE DISCLOSURE

A disc brake caliper is provided with brake pads on opposite sides of a rotating disc and is energized by engaging one pad with one side of the disc, causing the caliper to move to energize another pad with the other side of the disc, causing the caliper to pivot and engage another pad with a disc in a self-energized manner.

---

This invention relates to a disc brake assembly and more particularly to one in which the brake is energized for initial braking effort and is self-energized for additional braking effort.

The brake assembly may be utilized as a service brake or as a parking and emergency brake. The parking and emergency brake concept is herein disclosed. This brake is therefore mechanically energized by means of a lever arrangement. However, the brake may be energized by other means such as hydraulic, pneumatic or electrical apparatus. When disc parking brakes are provided, a relatively small amount of force is usually available to hold the brakes in the applied position. It is, therefore, desirable to provide self-energized brakes under these circumstances so as to increase the braking effect. A brake embodying the invention has a movable caliper mounted on a brake support in such a manner that the caliper can move axially and circumferentially relative to the disc and can also move pivotally in a plane parallel to the disc axis. The caliper is generally C-shaped and extends over an arcuate portion of the disc so that brake friction pads are positioned on opposite sides of the disc. In its broadest concept at least two friction pads are positioned on the caliper so that they are relatively fixed against brake applying movement relative to the caliper housing, and at least one pad is movably mounted on the caliper so that it can move into and out of fractional engagement with the disc under influence of suitable apparatus. Initial brake energization results from a clamping action initiated by movement of the movable friction pad and the resulting caliper reaction acting on the caliper support causes the caliper to pivot so as to bring one or more of the friction pads into braking engagement with the disc, thereby accomplishing self-energization.

In the drawings:

FIGURE 3 is a view of the caliper assembly of FIGURE 1 embodying the invention, with parts broken away and in section, and taken in the direction of arrows 3—3 of FIGURE 1;

FIGURE 4 is a view of some of the brake pads of the brake of FIGURE 3 taken in the direction of arrows 4—4 of that FIGURE;

Figure 1:
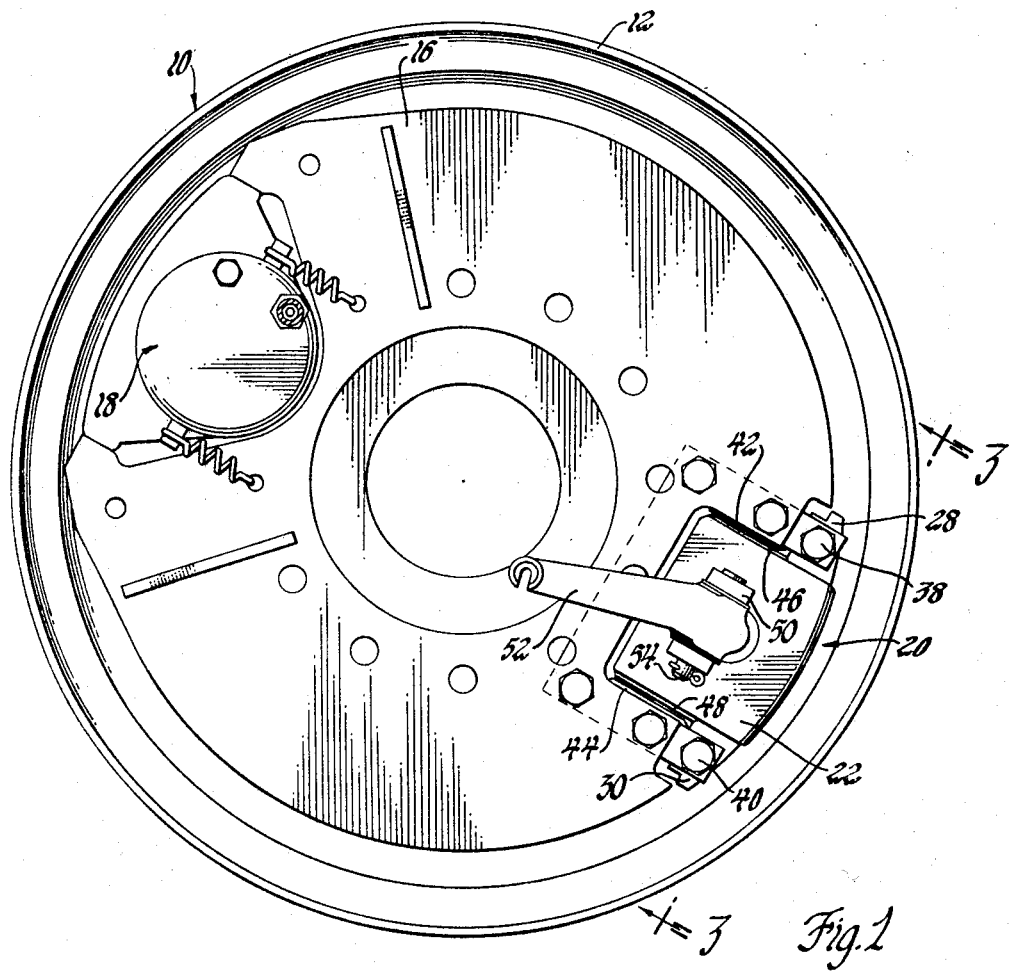
FIGURE 1 is an elevational view of a vehicle wheel brake assembly having a brake caliper assembly embodying the invention.
Figure 5:
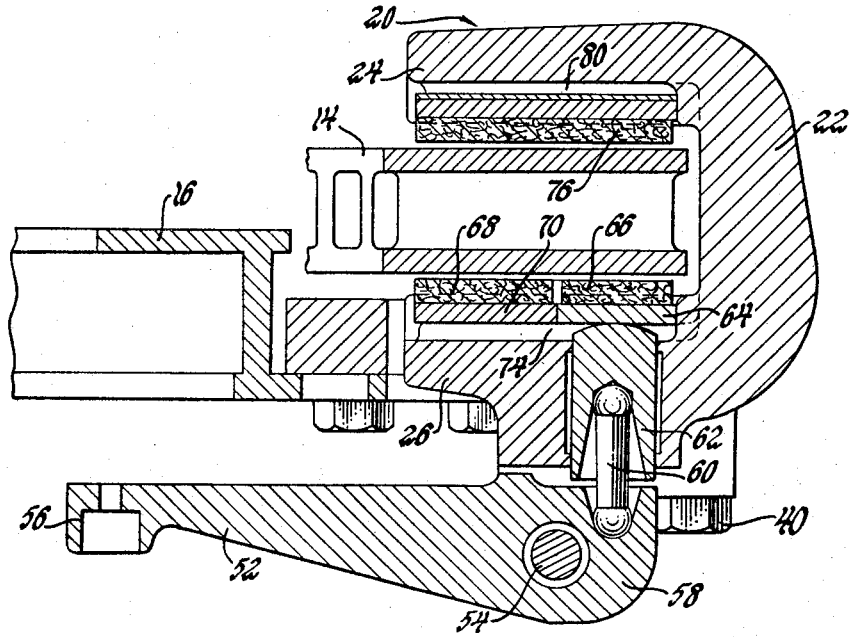
FIGURE 5 is a cross-sectional view of the brake assembly of FIGURE 3 taken in the direction of arrows 5—5 of that FIGURE.

The vehicle brake assembly 10 illustrated in FIGURE 1 includes a wheel 12 to which is attached a disc 14 to be braked, better seen in FIGURES 3 and 5. A caliper support member 16 is suitably secured to a nonrotatable portion of the vehicle and provides a mounting arrangement for the calipers of the brake assembly illustrated. In this instance the brake assembly includes a service brake caliper assembly 18 and a parking brake caliper assembly 20. Both caliper assemblies are positioned so that torque reactions are transmitted to the support 16.

Figure 2:
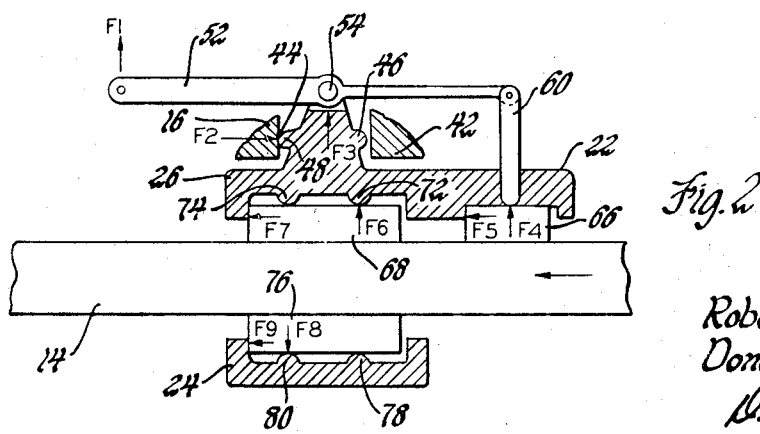
FIGURE 2 is a schematic illustration of the caliper assembly of FIGURE 1 embodying the invention.

The assembly 20 is illustrated in greater detail in FIGURES 3 and 5 and schematically in FIGURE 2. It includes a generally C-shaped caliper housing 22 having one side 24 extending so that it is adjacent an arcuate portion of one side of disc 14, and the other side 26 extending so that it is adjacent an arcuate portion of the other side of disc 14. The caliper housing is provided with ears 28, 30, 32, and 34 in which are positioned resilient grommets 36. Mounting bolts 38 and 40 extend through the grommets 36 so that bolt 38 resiliently mounts the caliper housing to the support member 16 by the ears 28 and 32, and bolt 40 resiliently mounts the caliper housing to the support member by means of ears 30 and 34. Torque reaction abutments 42 and 44 are provided on the support member 16 and are engageable with respective abutting surfaces 46 and 48 formed on the caliper housing 22. There is sufficient space between the abutments to permit the caliper to move freely axially of the disc and to permit limited pivotal movement of the caliper housing about either set of abutments, in a plane parallel to the disc axis, the pad pivotal abutment and the direction of pivotal movement depending upon the direction of rotation of the disc.

The housing has a suitable brake engaging apparatus connected therewith and, in the case of a parking brake, is preferably a mechanical leverage type of apparatus. Therefore, the housing 22 is provided with a yoke 50 on which is pivotally mounted a brake apply lever 52. A suitable pivot pin 54 interconnects the lever and the yoke. The end 56 of the lever may be connected to a brake apply cable and the end 58, on the opposite side of the pivot pin, acts on a push rod 60 which in turn acts on an apply piston 62. The piston 62 is reciprocably mounted in the caliper side 26 and engages the backing plate 64 of the friction pad assembly 66. This pad assembly is movable relative to the housing so that it can frictionally engage the disc 14. Another friction pad 68 is positioned in the housing side 26 so that its backing plate 70 engages ridges 72 and 74. These ridges or abutments are formed as integral parts of the housing side 26, extend generally parallel to a disc diameter and are circumferentially spaced relative to the disc. The pad 68, as is better seen in FIGURE 4, is provided with a recess 70 in which pad 66 is received. The illustrated embodiment shows pad 68 being generally U-shaped. However, it may have other configurations so long as it performs the inter-related functions required. Pad 76 is mounted on caliper side 24 so that it is frictionally engageable with a side of disc 14, and is also located relative to the caliper side by ridges 78 and 80. These ridges are similar to ridges 72 and 74. It can thus be seen that pads 68 and 76 do not move axially of the disc relative to the caliper housing, but remain in engagement with the support ridges.

When the brake is actuated, brake pad 66 is moved to engage the disc, with the reaction force acting through the pivot pin 54 to move the caliper axially of the disc so as to engage friction pad 76 with the disc. As can be better seen in FIGURE 2, this causes the caliper housing 22 to pivot about a set of abutments, such as abutments 42 and 46, in a plane parallel to the axis of rotation of the disc so as to bring friction pad 68 into braking engagement with the disc 14. This causes a self-energized action of the disc brake assembly.

In the particular construction disclosed in FIGURES 3 and 4, a friction pad 68 has sections 82 and 84 positioned on opposite sides of friction pad 66 so that when the disc is rotating in one direction pad section 82 becomes the self-energized portion, and when the disc is rotating in the other direction, pad section 84 becomes the self-energized portion. Therefore, the assembly operates in a self-energized manner whether the vehicle is traveling in the forward direction or the reverse direction or is being held against a tendency to travel in either direction.

Figure 6:
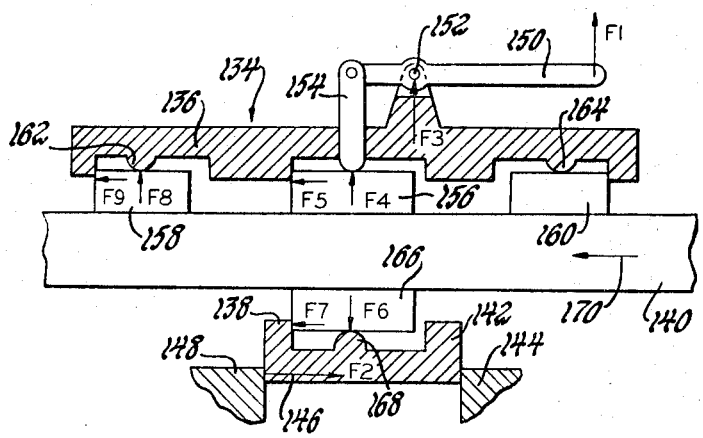
FIGURE 6 is a schematic illustration of a modified caliper assembly embodying the invention.

The modification schematically illustrated in FIGURE 6 includes a caliper housing 134 having sides 136 and 138 extending on opposite sides of the disc 140. The caliper housing has an abutment 142 which is engageable with the caliper support member 144 and a similar abutment 146 engageable with the abutment 148, also a part of the caliper support member 144. The brake apply lever 150 is pivotally attached at 152 to the caliper side 136 and actuates a plunger 154 which in turn moves friction pad 156 into braking engagement with a side of the disc 140. Friction pads 158 and 160 are also mounted in housing side 136, but move only with the housing in directions toward and away from the disc. They are provided with ridge-like abutments 162 and 164 so that they can maintain friction surface alignment with the disc 140. Caliper side 138 has friction pad 166 mounted thereon and stationary relative to the caliper side, except for the provision of the ridge-like abutment 168 which permits the friction pad to maintain friction surface alignment with the disc 140. When the brake is energized, pad 156 engages disc 140 and the reaction force moves the caliper so that pad 166 is also brought into engagement with the disc. The resultant torque reaction acts at the point of engagement of abutments 146 and 148, when the disc is rotating in the direction indicated by arrow 170, so that the caliper pivots counterclockwise about the abutment 148. This causes pad 158 to frictionally engage the disc for self-energization of the brake. If the disc is rotated in a direction opposite to arrow 170 and the brake is actuated, pad 160 will engage the disc instead of pad 158, with the same resultant self-energization.

What is claimed is:

1. A disc brake assembly comprising:
a rotatable disc to be braked,
a fixed caliper support adjacent said disc,
a brake caliper mounted on said support for limited axial and circumferential movement relative to said disc and for limited pivotal movement in a plane parallel to the disc axis,
said caliper being generally C-shaped and extending about an arcuate portion of said disc and having
first and second friction pads mounted thereon on opposite sides of said disc and stationary relative to said caliper
and a third friction pad mounted on said caliper for movement axially of said disc relative to said caliper
and means acting to move said third friction pad into engagement with said disc and reacting to move said caliper in the opposite direction from movement of said third friction pad so as to engage said first friction pad with the opposite side of said disc from said third friction pad,
and a caliper abutment formed on said caliper support and taking caliper reaction,
the frictional forces generated by the engagement of said first and third pads with said disc causing said caliper to pivot in the plane parallel to the disc axis so as to engage said second friction pad and said disc in braking relation whereby said brake assembly is self-energized.

2. The disc brake assembly of claim 1,
said caliper having a fourth friction pad mounted thereon adjacent said third friction pad with said second friction pad also being adjacent said third friction pad,
said second pad engaging said disc when said brake is energized with said disc rotating in one direction,
and said fourth friction pad engaging said disc when said brake is energized with said disc rotating in the other direction.

3. The disc brake assembly of claim 1,
said second and third friction pads being mounted on one side of said disc and said first friction pad being mounted on the other side of said disc.

4. The disc brake assembly of claim 1,
said second friction pad having an opening therein with said third friction pad being received within said second friction pad opening.

5. A disc brake comprising:
a disc,
a caliper having side sections extending on opposite sides of said disc
and having first and second friction pads mounted therein in friction surface alignment with said disc and movable with said caliper toward and away from said disc,
a third friction pad movably mounted in one caliper side section,
friction actuating means for moving said third friction pad into frictional engagement with said disc and reacting to move said caliper to engage said first friction pad with said disc, and
a caliper support member taking the caliper torque reaction at a point axially spaced from said disc whereby said caliper is pivoted about said support member in a plane substantially parallel to the disc axis to forcibly engage said second friction pad in braking relation with said disc,
said third friction pad being recessed and having said first friction pad positioned therein whereby the third friction pad portions circumferentially opposite said first friction pad are selectively moved into braking relation with said disc upon pivotal caliper movement depending upon the rotational direction of said disc at the time of braking.

References Cited

UNITED STATES PATENTS

| | | | |
|---|---|---|---|
| 3,047,098 | 7/1962 | Olley | 188—73 |
| 3,184,005 | 5/1965 | Thirion | 188—73 |
| 3,268,034 | 8/1966 | Burnett | 188—73 |
| 3,334,708 | 8/1967 | Swift | 188—73 |

FOREIGN PATENTS 1,025,373  4/1966  Great Britain.

GEORGE E. A. HALVOSA, *Primary Examiner.*

U.S. Cl. X.R.

188—140